(12) United States Patent
Manian et al.

(10) Patent No.: US 9,066,284 B2
(45) Date of Patent: Jun. 23, 2015

(54) SYSTEM, METHOD AND DEVICE FOR CALL POLICY ENFORCEMENT AND ROUTING BASED ON USER LOCATION

(75) Inventors: Vijay Manian, Sammamish, WA (US); Mahendra D. Sekaran, Sammamish, WA (US); Sankaran Narayanan, Redmond, WA (US); Dhigha D. Sekaran, Redmond, WA (US); Sundaram Anantharaman, Redmond, WA (US); Lingzhi Cao, Chicago, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 293 days.

(21) Appl. No.: 13/273,276

(22) Filed: Oct. 14, 2011

(65) Prior Publication Data

US 2013/0094407 A1    Apr. 18, 2013

(51) Int. Cl.
*H04L 12/66* (2006.01)
*H04W 40/20* (2009.01)
*H04W 40/24* (2009.01)

(52) U.S. Cl.
CPC .............. *H04W 40/20* (2013.01); *H04W 40/24* (2013.01)

(58) Field of Classification Search
USPC ........................................................ 370/260
See application file for complete search history.

(56) References Cited

U.S. PATENT DOCUMENTS

| 7,499,415 | B2 | 3/2009 | Dhesikan et al. | |
|---|---|---|---|---|
| 7,551,574 | B1* | 6/2009 | Peden et al. | 370/310.2 |
| 2003/0217150 | A1* | 11/2003 | Roese et al. | 709/225 |
| 2007/0207818 | A1 | 9/2007 | Rosenberg et al. | |
| 2009/0207757 | A1 | 8/2009 | Andreasen et al. | |
| 2010/0088425 | A1 | 4/2010 | Hooda et al. | |
| 2010/0197324 | A1 | 8/2010 | Bolin et al. | |
| 2012/0021730 | A1* | 1/2012 | Vendrow | 455/415 |

OTHER PUBLICATIONS

Cisco Customer Voice Portal (CVP) Release 3.1 Solution Reference Network Design (SRND). Call Survivability in Distributed Deployments.—Published Date: 2009 http://ieeexplore.ieee.org/stamp/stamp.jsp?tp=&arnumber=5353083.
Cisco Unified Communications SRND Based on Cisco Unified Communications Manager 7.x. Device Mobility.—Published Date: 2004 http://www.cisco.com/en/US/docs/voice_ip_comm/cucm/srnd/7x/devmobil.html.
Cisco. RSVP Precondition: Improve QoS in the VoIP Network. Feb. 2009. http://www.ciscosecure.net/en/US/prod/collateral/voicesw/ps6789/ps7046/ps6832/solution_overview_c22-521818.pdf.
Subramanian Chandrasekaran et al., U.S. Appl. No. 12/872,709, filed Aug. 31, 2010.

* cited by examiner

*Primary Examiner* — Man Phan
*Assistant Examiner* — Mewale Ambaye
(74) *Attorney, Agent, or Firm* — Andrew Smith; Jim Ross; Micky Minhas

(57) ABSTRACT

Call policy enforcement and routing is based on user location. A plurality of endpoints is provided for receiving and making calls. Each of the plurality of endpoints are assigned a default policy for controlling call authorization and providing call routing rules. A mapping of policies for a plurality of locations is stored. A location of a client associated with one of the plurality of endpoints is identified. A location-based policy is obtained from the stored mapping of policies of the plurality of locations based on the identified location of the client. The obtained location-based policy is applied instead of the default policy assigned to the client associated with one of the plurality of endpoints.

19 Claims, 6 Drawing Sheets

SYSTEM, METHOD AND DEVICE FOR CALL POLICY ENFORCEMENT AND ROUTING BASED ON USER LOCATION

FIELD OF THE INVENTION

This disclosure relates in general to technical communications networks and optimized routing of calls by applying policy based on user location.

BACKGROUND

A Unified Communications (UC) solution allows users to sign on to UC servers from anywhere in the world and continue to make and receive audio calls to and from Public Switched Telephone Network (PSTN). Each user is also assigned a unique telephone number and all calls to that telephone number are routed to the user's client endpoint(s). A UC deployment has one or more servers where clients register and infrastructure to talk to PSTN via one or more media gateways (IP-PBX, PSTN Gateway or SIP Trunks).

Each user is also assigned policies that control call authorization, such as which telephone numbers the user is allowed to call, and call routing rules, such as which media gateway routes the call to PSTN when the call is authorized. This policy assignment is based solely on user identity and does not depend on the physical location of the user. For example, a user who is assigned a Redmond telephone number and homed on a server in Tukwila may sign in from a hotel in New Delhi, India. In such cases, the same policies are applied and the call will be routed as if the user is signed in from Redmond.

The administrator of the UC system may want to enforce different authorization policies and routing rules based on the physical location of the client. There are multiple reasons why the administrator may want to enforce different authorization policies and routing rules based on the physical location of the client. For example, legal compliance regulations in some countries govern which legs of a call between two parties can traverse via VoIP (Voice over IP) and which legs have to be routed over PSTN. These rules vary from country to country and are even harder to enforce in UC world. In addition, there may be reasons that are based on WAN bandwidth management. For example, the audio data between the client endpoint and the media gateway flows over the company network. The administrator may choose to route the call over a media gateway that is closer to the physical location of the endpoint so that the call consumes less WAN bandwidth.

Currently, there are no solutions for meeting the vast complexity of legal compliance regulations based on the physical location of the user. Regarding bandwidth management, call admission control is a well-known feature for providing bandwidth management. For a call between two media endpoints, e.g., clients and a media gateway, both endpoints check with a policy server to see if bandwidth is available. However, for inbound calls from PSTN, if bandwidth is not available between the client endpoint and the media gateway on which the PSTN call landed, the call is rejected. For outbound calls, if bandwidth is not available, then an alternate route based on the policy assigned to the user is tried if one is available. Here again, the alternate routes are assigned to the user and is not based on the location. Thus, these solutions will not work in all cases.

Accordingly, there is a need for a system, method and device for call policy enforcement and routing based on user location.

SUMMARY OF THE INVENTION

To overcome the limitations described above, and to overcome other limitations that will become apparent upon reading and understanding the present specification; embodiments for a system, method and device for providing call policy enforcement and routing based on user location are disclosed.

The above-described problems are solved by leveraging the communications server to query a stored mapping of call authorization and routing policies for various locations from the database and establish a call accordingly. Communications networks interact though various gateways providing connectivity.

An embodiment includes a system providing call policy enforcement and routing based on user location. The system includes a plurality of endpoints for receiving and making calls and a communications server, coupled to the plurality of endpoints, for performing inbound and outbound call identification, call routing, and policy management, the communications server assigning each of the plurality of endpoints a default policy for controlling call authorization and providing call routing rules, storing a mapping of policies for a plurality of locations, identifying a location of a client associated with one of the plurality of endpoints, obtaining a location-based policy from the stored mapping of policies of the plurality of locations based on the identified location of the client and applying the obtained location-based policy instead of the default policy assigned to the client associated with one of the plurality of endpoints.

Another embodiment includes a method for providing call policy enforcement and routing based on user location. The method includes providing a plurality of endpoints for receiving and making calls, assigning each of the plurality of endpoints a default policy for controlling call authorization and providing call routing rules, storing a mapping of policies for a plurality of locations, identifying a location of a client associated with one of the plurality of endpoints, obtaining a location-based policy from the stored mapping of policies of the plurality of locations based on the identified location of the client and applying the obtained location-based policy instead of the default policy assigned to the client associated with one of the plurality of endpoints.

Another embodiment includes a computer readable storage medium including executable instructions which, when executed by a processor, provides call policy enforcement and routing based on user location by providing a plurality of endpoints for receiving and making calls, assigning each of the plurality of endpoints a default policy for controlling call authorization and providing call routing rules, storing a mapping of policies for a plurality of locations, identifying a location of a client associated with one of the plurality of endpoints, obtaining a location-based policy from the stored mapping of policies of the plurality of locations based on the identified location of the client and applying the obtained location-based policy instead of the default policy assigned to the client associated with one of the plurality of endpoints.

These and various other advantages and features of novelty are pointed out with particularity in the claims annexed hereto and form a part hereof. However, for understanding the disclosed embodiments, the advantages, and the objects obtained, reference may be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to call policy enforcement and routing solution based on user location and associated grouping of IP addresses for optimized legal compliance and bandwidth management.

Figure 1:
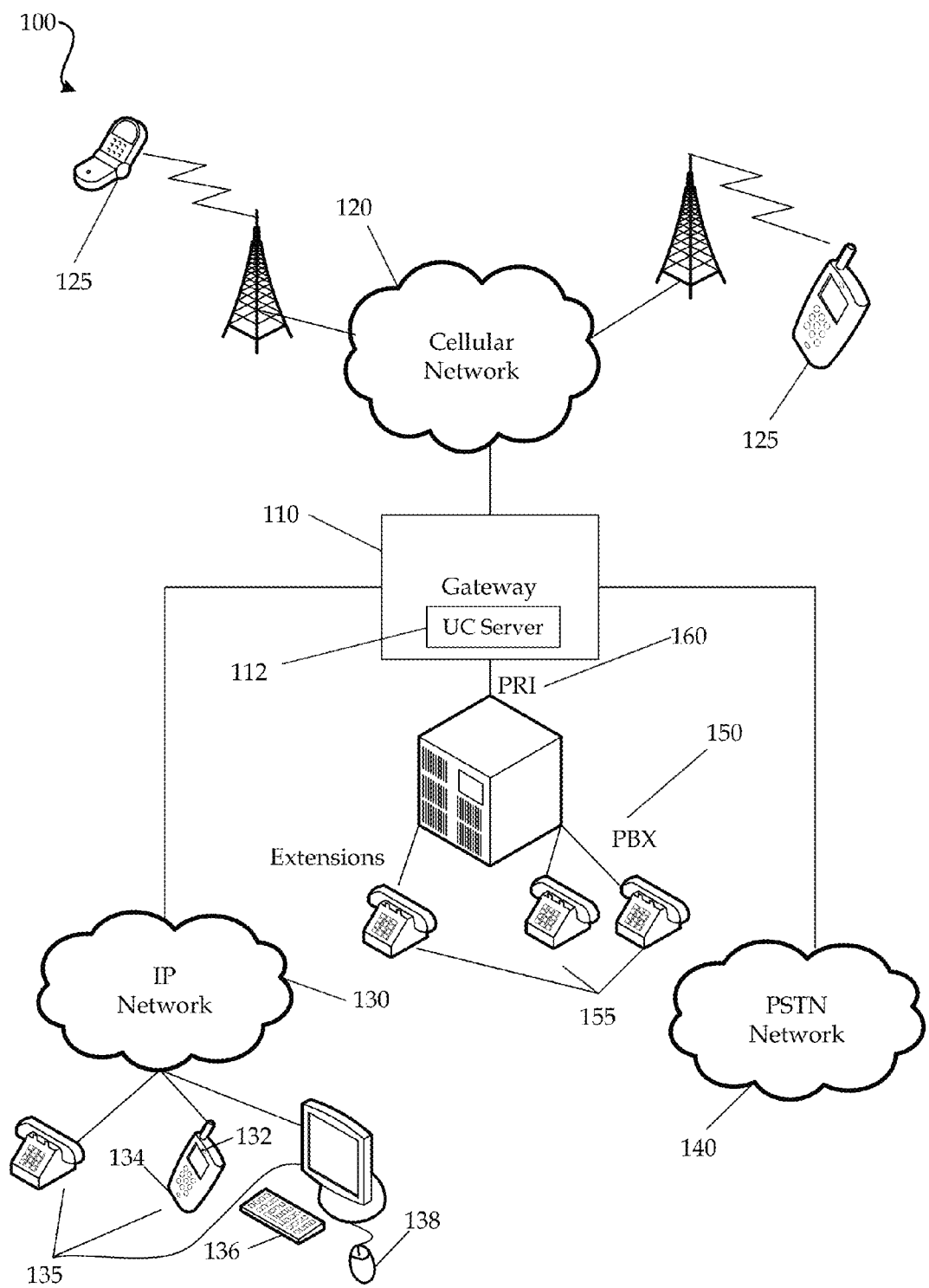
FIG. 1 provides a high level architecture of the unified communications networks that communicate through the gateway according to one embodiment.

FIG. 1 provides a high level architecture of the unified communications networks that communicate through the gateway 100 according to one embodiment. Gateways 110, also commonly referred to as Media gateways are devices which enable interconnection of unlike networks/systems for separate signaling and media (i.e. voice) transmissions. For example Voice over IP networks 130 are interconnected to conventional Public Switched Telephone (PSTN) 140 and telephone networks through gateways. For those skilled in the art, current specialized gateway(s), or media gateway(s) technologies enable interconnection of Cellular Networks 120, IP networks 130, and PSTN networks 140. For example, enterprise PSTNs connect multiple private branch exchanges (PBXs) 150 to external locations or unlike systems with gateways using Primary Rate Interfaces (PRI) 160 to enable up to 24 concurrent session groupings. Thus, private and/or public internet and switching networks can be optimally interconnected, such as IP networks 130 and switched networks including public switched telephone networks (PSTN) 140, as well as cellular networks 120 and other wireless networks. A variety of endpoints interact with a communications server which can perform inbound and outbound call identification, call routing, and policy (i.e. call admission control) management when any of the following initiates a call: PSTN endpoints, enterprise PBX endpoints 155, cellular endpoints 125, VoIP endpoints 135, and the like. In FIG. 1, UC capabilities 112 are integrated with Gateway 110. However, those skilled in the art will understand that VoIP endpoints may communicate through a separate UC server and a separate Gateway 110, e.g., a connection may be made from VoIP Endpoint 135 through a separate UC Server (not shown) and eventually another VoIP Endpoint, with or without a Gateway 110 provided separately.

Users may use endpoints 125, 135 155 for making and receiving calls. Some endpoints 125, 135 155 may be coupled to a camera 132 that may be operative to record and capture motions and/or gestures made by a user. Endpoints 125, 135 155 may be further operative to capture words spoken by user, such as by a microphone 134, and/or capture other inputs from user such as by a keyboard 136 and/or mouse 138. Consistent with embodiments of the invention, camera 132 may comprise any motion detection device capable of detecting the movement of user. For example, camera 132 may comprise a Microsoft® Kinect® motion capture device comprising a plurality of cameras and a plurality of microphones.

Figure 2:
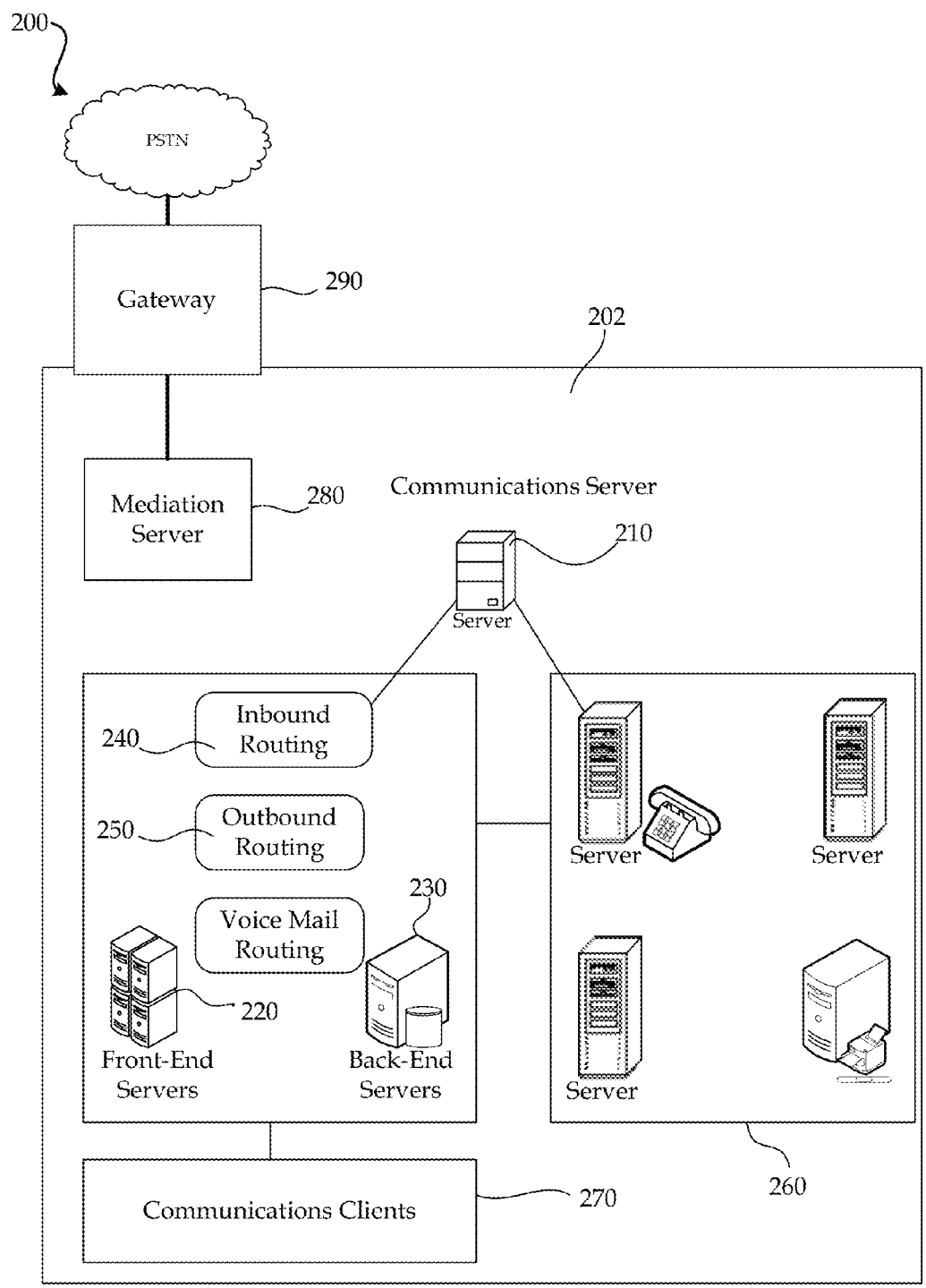
FIG. 2 provides a diagram of a communications server environment according to one embodiment.

FIG. 2 provides a diagram of a communications server environment 200 according to one embodiment. A communications server 202 is a distributed server environment in which independent software modules may work in conjunction to provide its many features. Communications server 202 includes policy server 210, one or more Front End Servers 220, one or more Back End Servers 230, mediation server 280, communication clients 270 and additional software modules 260, e.g. servers. More specifically, a communications server pool includes one or more Front End Servers 220 that provide IM, presence, and conferencing services and are connected to a database server (Back End Servers 230) for storing user and conference information. A mapping of call authorization and routing policies for a plurality of locations identified by IP address ranges are stored at Back End Servers 230 as well as client registration information. Those skilled in the art understand the Front End Servers 220 are responsible for handling signaling among servers and between software modules 260, e.g., servers, and clients 270, authenticating users and maintaining user data, and routing VoIP calls within the enterprise and to the PSTN. Additionally, other tasks involve but are not limited to aggregating enhanced presence information of users for clients and routing signaling and IM traffic. These services may be supported via some of the following software modules 260: a web conferencing server, an A/V conferencing server, an Internet Information (II) server, a telephony conferencing server, etc. The Inbound Routing component 240 will handle incoming calls largely according to preferences that are specified by user's location on their clients 270. The Outbound Routing component 250 routes calls to PBX or PSTN destinations. The Outbound Routing component 250 applies call authorization rules to callers and determines the optimal media gateway for routing each call based on user location. A mediation server 280 may be used to perform signaling and media translation between the VoIP infrastructure and a media gateway 290. The media gateway 290 may include devices that translate signaling and media between the PSTN and the enterprise voice infrastructure.

Figure 3:
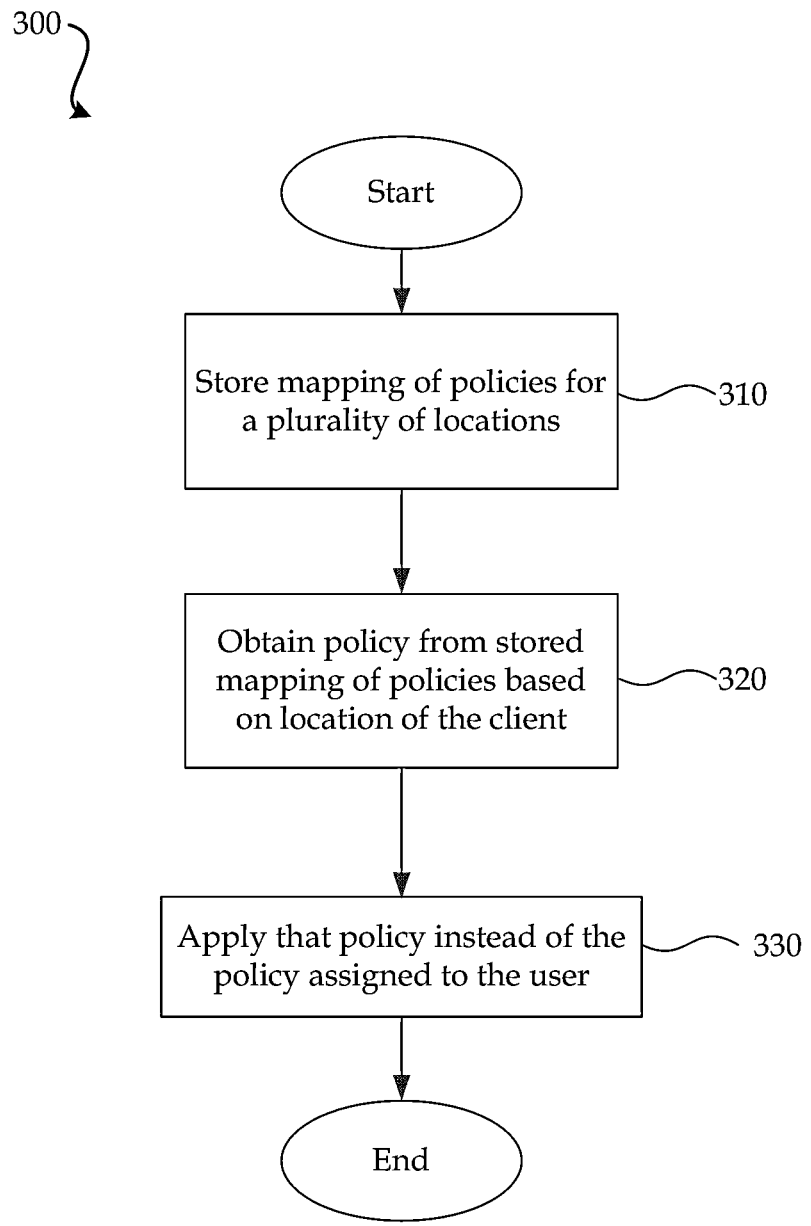
FIG. 3 is a block diagram of the call policy enforcement and routing process based on user location for inbound and outbound PSTN calls according to one embodiment.

FIG. 3 is a block diagram of the call policy enforcement and routing process based on user location 300 for inbound and outbound PSTN calls according to one embodiment. The communications server stores a mapping of call authorization and routing policies for various locations (identified by IP address range/subnet) 310. The IP address/subnet of each client registered with the server is also stored. Thus, an IP Address range is mapped to call routing policies. The system configures known IP address ranges and assigns policies to them. The assignment may be based on legal regulations and the desired bandwidth. For example, if the enterprise has a range of IP addresses corresponding to its office located in City A and the local laws call for all calls from users in City A to egress out of the media gateway in that city, then the policy assigned to that range of IP addresses is configured to reflect this regulation. The default behavior for unknown IP addresses is to reject the call. However, the system may override this behavior and apply the policy assigned to the user. When a client endpoint registers with the server, it sends its IP address and subnet mask as part of the registration request. This information is stored in the server database along with other registration information.

When inbound and outbound PSTN calls are received, the communications server obtains a policy from the stored mapping of policies for a plurality of locations based on the location of the client 320. When a client makes an outbound call to a PSTN number, the server first looks up the IP address/subnet mask associated with that particular client endpoint's registration and then determines which IP address range the client belongs to. When an incoming call to a user's PSTN number comes in from the gateway, the call may be routed to the registered endpoints of the user. For each endpoint, the server looks up the IP address from its registration database, and routes the request to that endpoint only if the policy associated with its corresponding IP address range allows communication with the originating gateway.

Thus, for outbound calls from a client to a PSTN number, the server will apply the policy corresponding to the IP address of the client instead of the policy assigned to the user 330. Similarly, for inbound calls from PSTN, for each registered endpoint of the user the call is targeted at, the server consults the policy corresponding to IP address of the endpoint and applies corresponding policy 330. In both cases, policy based on location is applied 330.

Figure 4:
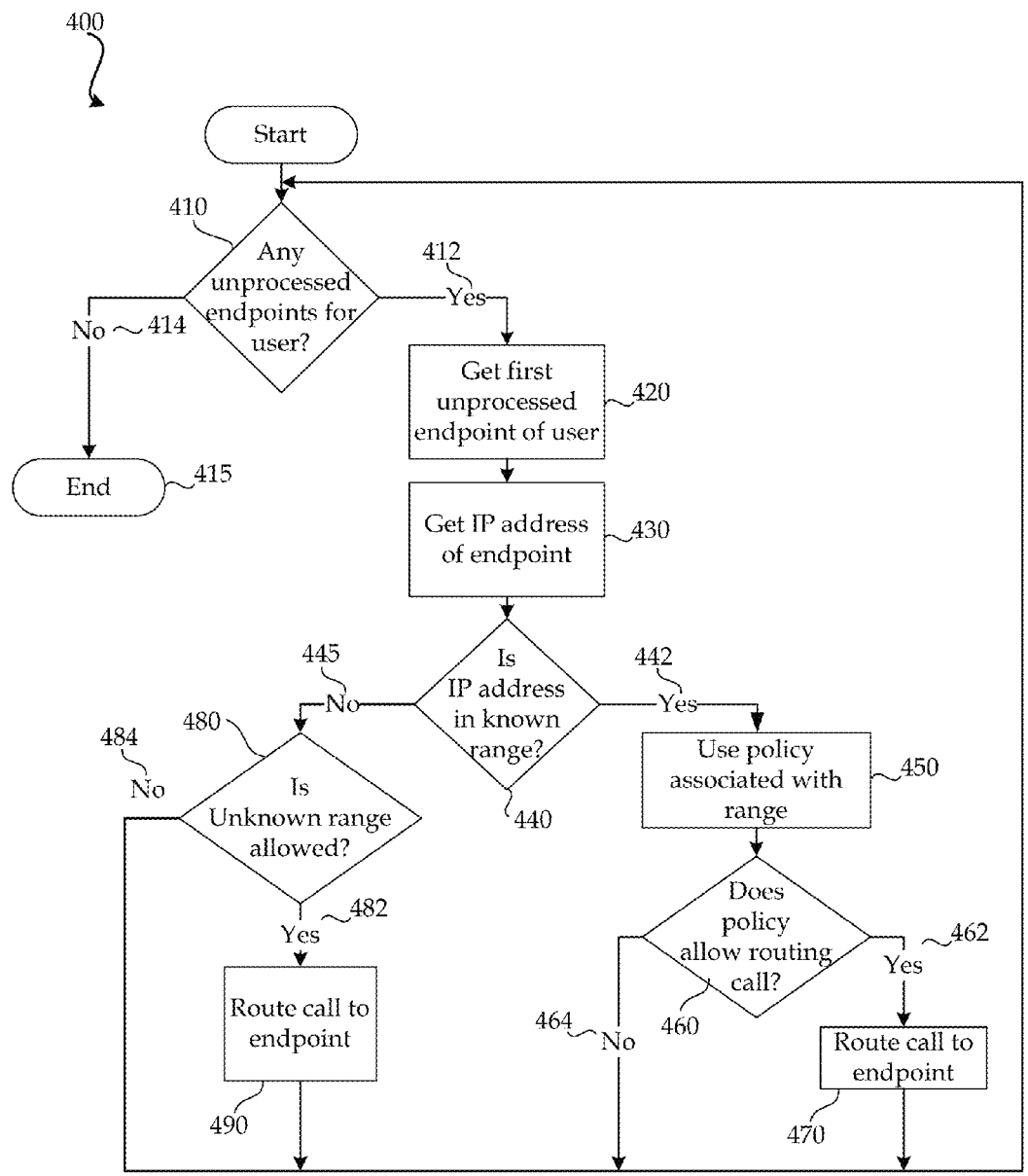
FIG. 4 provides a flowchart of the inbound call routing process using policy enforcement according to one embodiment.

FIG. 4 provides a flowchart of the inbound call routing process 400 using policy enforcement according to one embodiment. Those skilled in the art recognize that the gateway sends the IP telephony signaling protocol invite to the communications server which contains the phone number. When the incoming call to a user's PSTN number comes in from the gateway, the call may be routed to the registered endpoints of the user. For each endpoint, the server looks up the IP address from its registration database, and routes the request to that endpoint only if the policy associated with its corresponding IP address range allows communication with the originating gateway. The user may have multiple endpoints so the server will iterate through user's endpoints for processing. Accordingly, the server checks for any unprocessed endpoints 410. If there are unprocessed endpoints 412, the server retrieves the first unprocessed endpoint of user 420. The server retrieves the IP address of the endpoint from its registration information 430, then and queries the database to check if the IP address is in a known range 440. If so 442, the policy associated with IP address range is applied 450. A determination is made whether the policy allows communication with the originating gateway and routing the call 460. If yes 462, the server routes the call to endpoint 470. If not 464, the process returns.

If the IP address is not in a known range 445, the server checks if routing is allowed for an unknown range 480. If the routing is allowed for an unknown range 482, the call is routed to the endpoint 490. If not 484, the process returns and the server determines whether there are additional endpoints associated with a user that have not been processed 410. If all endpoints are processed 414, the process terminates 415.

Figure 5:
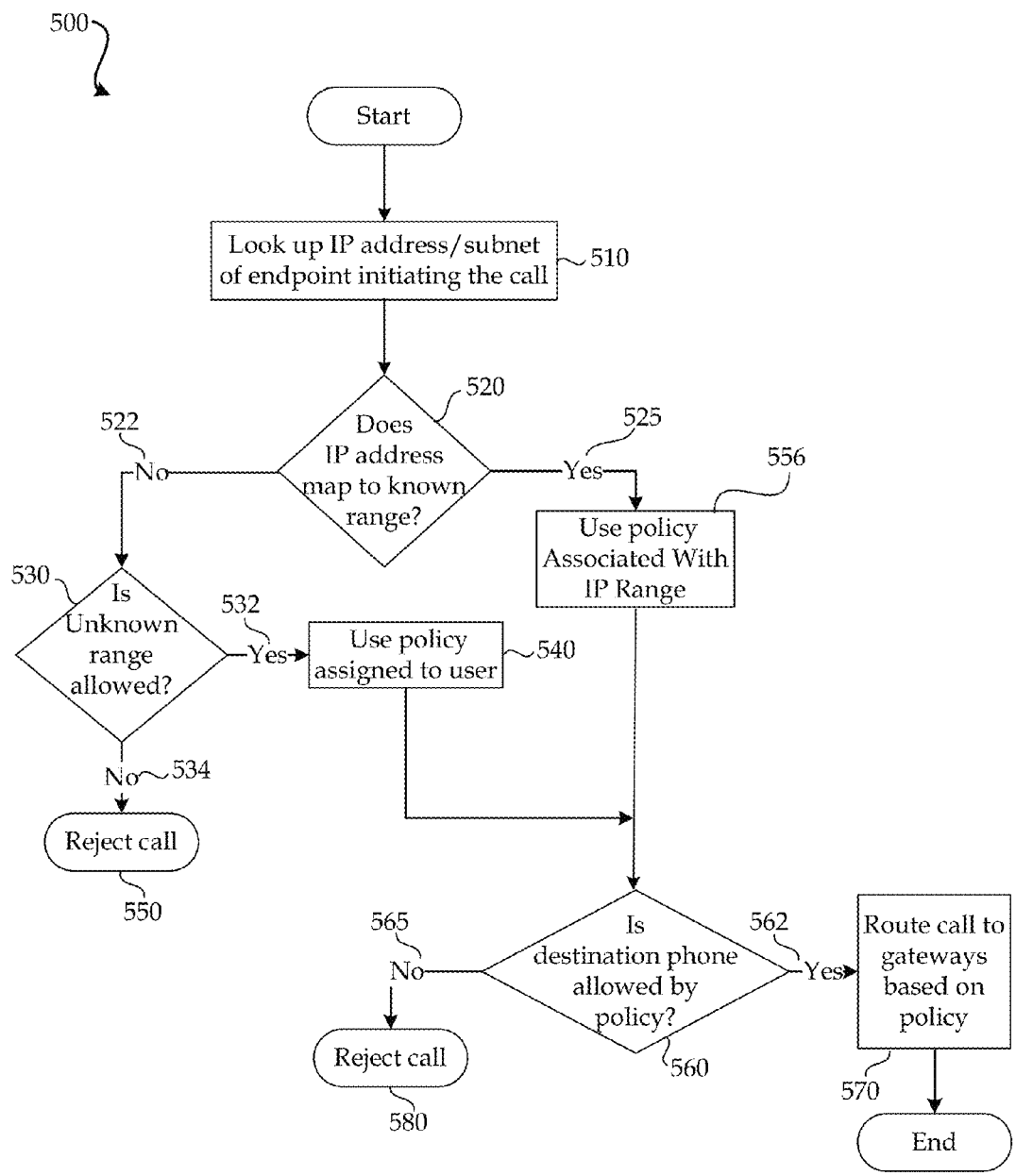
FIG. 5 provides a flowchart of the outbound call routing process using policy enforcement according to one embodiment.

FIG. 5 provides a flowchart of the outbound call routing process 500 using policy enforcement according to one embodiment. For an outbound call from a client to a PSTN number, the server will apply the policy corresponding to the IP address of the client instead of the policy assigned to the user. When a client endpoint registers with the server, it sends its IP address and subnet mask as part of the registration request. This information is stored in the server database along with other registration information. When a client makes an outbound call to a PSTN number, the server first looks up the IP address/subnet mask associated with that particular client endpoint's registration (endpoint initiating the call) 510. It then compares the appropriate endpoint's IP address/subset mask 510 to the database of IP policy address ranges to select and apply the policy associated with that range. Thus, the server determines if the IP address maps to a known range in the database 520. If the client endpoint's IP address does not map to a known range in the database 522, the routing server checks to see if an unknown range is allowed 530. If yes 532, the routing server may use the policy assigned to the user 540. If not 534, the call is rejected 550. If the IP address maps to the known range 525, the policy associated with the IP range 556 is used. The server then checks to see if the destination phone is allowed by the assigned policy 560. If yes 562, the call is routed to gateways based on the policy 570. If the destination phone is not allowed by policy 565, the call is rejected 580.

Figure 6:
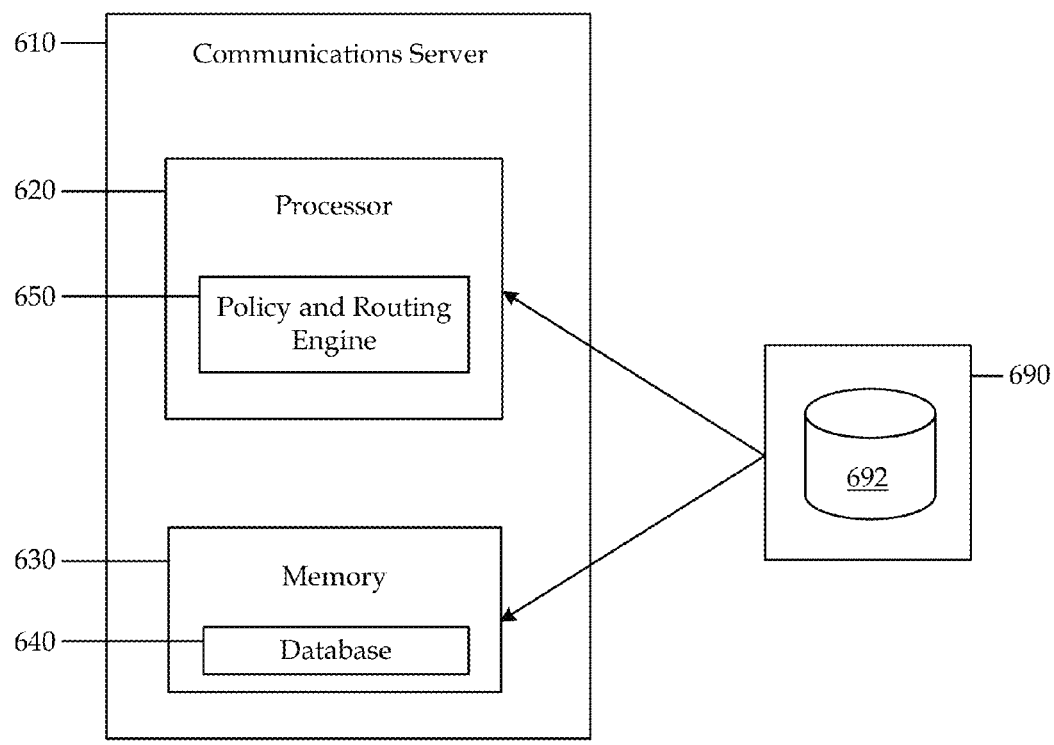
FIG. 6 illustrates a suitable computing environment for implementing a system as described above in FIGS. 1-5 according to an embodiment.

FIG. 6 illustrates a suitable computing environment 600 for implementing a system as described above in FIGS. 1-5 according to an embodiment. In FIG. 6, a communications server for accomplishing call control and selecting routing based on user location 610 includes a processor 620 and memory 630. Embodiments may also be implemented in combination with other types of computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, those skilled in the art will appreciate that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processors 620 may be configured to execute instructions that perform the operations of embodiments. Those skilled in the art will appreciate that various embodiments can be implemented (1) as a sequence of computer implemented acts or program modules running on a processing device and/or (2) as interconnected machine logic circuits or circuit modules within the processing devices. The implementation may be a matter of choice dependent, for example, on the performance choices. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 630 thus may store the computer-executable instructions that, when executed by processor 620, cause the policy and routing engine 650 to implement inbound and outbound call routing based on the policy of the user location as described above with reference to FIGS. 1-5. Mapping of policies may be maintained in database 640.

Moreover, embodiments as illustrated in FIGS. 1-6 may be implemented using cloud computing, grid computing, P2P and other distributed computing environments or configurations. Embodiments as illustrated in FIGS. 1-6 may be implemented via a system-on-a-chip (SOC) where each or many of the components illustrated in FIG. 6, for example, may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the call policy enforcement based on a user's location may be operated via application-specific logic integrated with other components of the computing device/system X on the single integrated circuit (chip). Still further, embodiments as illustrated in FIGS. 1-6 may be implemented using a framework for running applications on large clusters, where an application is divided into many small fragments of processes, each of which may be executed on any node in the cluster using a distributed file system so that node failures are automatically handled.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A system providing call policy enforcement and routing based on user location, comprising:
    a plurality of endpoints for receiving and making calls; and
    a communications server, coupled to the plurality of endpoints, for performing inbound and outbound call identification, call routing, and policy management, the communications server assigning each of the plurality of endpoints a default policy for controlling call authorization and providing call routing rules, storing a mapping of call authorization and routing policies, which are different from the default policy, for a plurality of locations, the mapping comprising a range of IP addresses associated each of the plurality of locations and the call authorization and routing policies for the plurality of locations, identifying a location of a client associated with one of the plurality of endpoints, obtaining a location-based policy from the stored mapping of call authorization and routing policies of the plurality of locations based on the identified location of the client and applying the obtained location-based policy instead of the default policy assigned to the client associated with one of the plurality of endpoints.

2. The system of claim 1, wherein the plurality of endpoints comprise PSTN endpoints, enterprise PBX endpoints, cellular endpoints and VoIP endpoints.

3. The system of claim 1, wherein the communications server includes at least one front-end server for supporting instant messaging and conferencing services and at least one database server for storing user and conference information, the mapping of call authorization and routing policies, and client registration information.

4. The system of claim 3, wherein the front end server comprises a web conferencing server, an A/V conferencing server, an Internet Information (II) server, and a telephony conferencing server.

5. The system of claim 1, wherein the communications server comprises an inbound routing component for handling incoming calls according to preferences specified according to a location associated with the client.

6. The system of claim 1, wherein the communications server comprises an outbound routing component for routing calls to PBX or PSTN destinations, applying call authorization rules to callers and determining a media gateway for routing each call to based on user location.

7. The system of claim 1, wherein the communications server is configured to process signaling between servers and clients, authenticating users, maintaining user data, routing VoIP calls within the enterprise and to the PSTN.

8. The system of claim 1 further comprising a media gateway for translating signaling and media between the PSTN and the enterprise voice infrastructure and a mediation server for performing signaling and media translation between the VoIP infrastructure and the media gateway.

9. The system of claim 1 further comprising a gateway for coupling a plurality of disparate networks and providing communication between the plurality of disparate networks.

10. The system of claim 9, wherein the gateway enables interconnection of the plurality of disparate networks using Primary Rate Interfaces (PRI).

11. A method for providing call policy enforcement and routing based on user location, comprising:
    providing a plurality of endpoints for receiving and making calls;
    assigning each of the plurality of endpoints a default policy for controlling call authorization and providing call routing rules;
    storing a mapping of call authorization and routing policies, which are different from the default policy, for a plurality of locations, the mapping comprising a range of IP addresses associated with each of the plurality of locations and the call authorization and routing policies for the plurality of locations;
    identifying a location of a client associated with one of the plurality of endpoints;
    obtaining a location-based policy from the stored mapping of call authorization and routing policies of the plurality of locations based on the identified location of the client; and
    applying the obtained location-based policy instead of the default policy assigned to the client associated with one of the plurality of endpoints.

12. The method of claim 11, wherein the policies apply to inbound and outbound PSTN calls.

13. The method of claim 11 further comprising sending an IP address and subnet mask of a client when the client registers with the server and storing the IP address and subnet mask of a client in a server database along with other registration information.

14. The method of claim 11 further comprising looking up an IP address and subnet mask associated with the client when a client makes an outbound call to a PSTN number, determining an IP address range associated with the client, and selecting and applying a policy associated with the determined IP address range.

15. The method of claim 11 further comprising receiving an incoming call from a gateway to a PSTN number associated with a client, routing the incoming call to the registered endpoints associated with the client, and for each endpoint associated with the client, determining an IP address from a registration database and routing the request to the endpoint only if the policy associated with the IP address range of the determined IP address allows communication with the gateway.

16. The method of claim 11, wherein a gateway sends an IP telephony signaling protocol invite to a communications server associated with a called phone number.

17. The method of claim 11 further comprising determining an IP address range associated with the client, identifying whether an IP address associated with the mapping of call authorization and routing policies to the determined IP address range in the database, and when the IP address maps to the determined IP address range applying a policy assigned to the IP address range, checking to determine if a destination endpoint is allowed by the default policy before routing the call to gateways based on the policy and if the destination phone is not allowed by policy rejecting the call, else when the IP address does not map to the determined IP address range, checking to determine if an unknown range is allowed, using the default policy assigned to the user if an unknown range is allowed and rejecting the call if an unknown range is not allowed.

18. A computer readable storage device including executable instructions which, when executed by a processor, provides call policy enforcement and routing based on user location, by:

providing a plurality of endpoints for receiving and making calls;

assigning each of the plurality of endpoints a default policy for controlling call authorization and providing call routing rules;

storing a mapping of call authorization and routing policies, which are different from the default policy, for a plurality of locations, the mapping comprising a range of IP addresses associated with each of the plurality of locations and the call authorization and routing policies for the plurality of locations;

identifying a location of a client associated with one of the plurality of endpoints;

obtaining a location-based policy from the stored mapping of call authorization and routing policies of the plurality of locations based on the identified location of the client; and applying the obtained location-based policy instead of the default policy assigned to the client associated with one of the plurality of endpoints.

19. The computer readable storage device of claim 18 further comprising determining an IP address range associated with the client, identifying whether an IP address associated with the client maps to the determined IP address range, and when the IP address maps to the determined IP address range applying a policy assigned to the IP address range, checking to determine if a destination endpoint is allowed by the default policy before routing the call to gateways based on the policy and if the destination phone is not allowed by policy rejecting the call, else when the IP address does not map to the determined IP address range, checking to determine if an unknown range is allowed, using the default policy assigned to the user if an unknown range is allowed and rejecting the call if an unknown range is not allowed.

* * * * *